Patented Feb. 25, 1947

2,416,456

UNITED STATES PATENT OFFICE 2,416,456

FLUORO-BUTADIENE POLYMERS

Leroy Frank Salisbury, Wilmington, Del., assignor to E. I. du Pont de Nemours & Company, Wilmington, Del., a corporation of Delaware No Drawing. Application May 27, 1944, Serial No. 537,727

3 Claims. (Cl. 260—86.5)

This invention relates to the preparation of an improved synthetic rubber-like material, and more particularly to synthetic rubber-like material produced by polymerizing a mixture of fluoroprene (2-fluoro-1,3-butadiene) and styrene, which material is of particular value in electrical insulations.

It is well known that the polychloroprene vulcanizates have excellent oil resistance as well as outstanding resistance to sunlight and ozone aging, and have therefore been found to be of value as the outer coating for electrical insulations. Polychloroprene, however, is not as good a dielectric as natural rubber, and therefore it has generally been employed as an outer coating over rubber insulations. Polychloroprene, furthermore, does not have as good flexibility at very low temperatures as may be desired for many purposes, so that continual attempts are being made to produce a synthetic elastomer which will exhibit still further improvements in freeze resistance, electrical insulation properties, etc. It has been found that polyfluoroprene has good oil, sunlight and ozone resistance and shows electrical resistivity and low temperature properties approaching those of natural rubber, but without being modified in some way it possesses poor processing characteristics and inferior tensile properties.

It is therefore the object of this invention to provide a new synthetic rubber-like material which will have good resistance to sunlight, ozone and oil, and which will possess good tensile strength and good electrical insulation properties, and which will have materially improved processing properties over those found in polyfluoroprene itself.

I have found that a novel series of elastomers, which combine good flexibility at low temperatures and high resistance to deterioration by oil, sunlight and ozone and which exhibit excellent electrical insulation properties, can be produced by polymerization to rubber-like products of a monomer mixture comprising 60% to 90% of fluoroprene and 40% to 10% of styrene. These products are further characterized by having improved processing characteristics and superior tensile strength, as compared with polyfluoroprene itself. That the polymerization of styrene with fluoroprene effects a desired improvement in tensile properties is surprising, since corresponding chloroprene-styrene copolymers show no appreciable advantage in this respect. These new elastomers are preferably produced by the emulsion-polymerization process which, in general, may be carried out as follows.

A mixture containing 60% to 90% of fluoroprene and 40% to 10% of styrene is dispersed in an aqueous emulsion containing an emulsifying agent and a polymerization catalyst, preferably of the peroxide type (including persulfates). In most cases it is desirable to include a sulfur containing modifying agent. The emulsion of monomers so obtained is polymerized at a temperature usually in the range 10° to 40° C. The resulting latex, after being stabilized with an antioxidant such as phenyl-alpha-naphthylamine, is coagulated, and the rubber-like coagulum is masticated and washed free of residual salts on a corrugated rubber mill and is finally dried by milling on a smooth roll. The plastic product is then compounded, molded, and vulcanized. If desired for certain operations, the latex can be compounded and used as such, following conventional procedures for the production of articles from rubber latex.

It is preferably to use fluoroprene which is substantially free of monovinylacetylene and peroxides. It may be prepared by the vapor phase reaction of monovinylacetylene with hydrogen fluoride, as described in copending applications of Coffman & Salisbury Serial No. 508,241, Coffman & Salisbury Serial No. 508,242 and Salisbury Serial No. 508,243, all filed on October 29, 1943.

Example

A mixture of 90 parts of fluoroprene and 10 parts of styrene is emulsified in 157 parts of an aqueous solution containing 4 parts of sodium oleate, 0.5 part of excess sodium hydroxide, 1 part of a formaldehyde/sodium naphthalenesulfonate condensation product, 1 part of potassium persulfate, and 0.1 part of potassium ferricyanide. Three-tenths part of lauryl mercaptan is added and the emulsion is heated for 5.5 hours at 30° C. in a sealed glass-lined vessel equipped for efficient agitation. The resulting latex is treated with an antioxidant consisting of 2 parts of a phenyl-alpha-naphthylamine and diphenylamine (55:45) mixture dispersed in water. The stabilized latex is coagulated by means of brine and acetic acid, masticated and washed on a corrugated rubber mill to free it of residual salts and finally dried on a smooth mill at an elevated temperature. The product consists of 93 parts of coherent, plastic material having better processing characteristics than polyfluoroprene similarly prepared.

The dry polymer is then compounded according to the following formula:

| | Parts |
|---|---|
| Polymer | 100 |
| Channel carbon black | 40 |
| Extra light calcined magnesia | 10 |
| Sulfur | 2 |

The compounded stock is pressed to the desired shape in a mold and cured for 60 minutes at 153° C. under pressure. The vulcanizate has a tensile strength of 3320 lbs./sq. in. at 425% elongation and a 300% modulus of 1730 lbs./sq. in. The freeze resistance of this vulcanizate is excellent, as indicated by a $T_{10}$ value of $-42°$ C., and the oil resistance is quite good, as indicated by a volume increase of only 100% after two days in kerosene at 100° C. Furthermore, the vulcanizate is characterized by good resilience (Schopper rebound of 48%) and much better ozone and sunlight resistance than natural rubber.

The $T_{10}$ value, indicative of freeze resistance, is determined as follows: A vulcanizate of uniform cross-section is stretched 170% and cooled slowly to $-70°$ C. in this stretched condition. The tension on the sample is then released, the temperature is raised slowly, and the sample is allowed to contract freely. The temperature at which the sample shows 10% of the total retraction possible is the $T_{10}$ value. Thus, the lower the $T_{10}$ value, the greater is the freeze resistance.

A series of fluoroprene copolymers, prepared and compounded as described above, show the following properties after vulcanization.

| Per cent styrene | Tensile strength, p. s. i. | Per cent elongation | Per cent rebound | $T_{10}$, ° C. | Per cent kerosene absorption |
|---|---|---|---|---|---|
| 10 | 3,320 | 425 | 48 | −42 | 100.9 |
| 15 | 4,090 | 520 | 43 | −38 | 97.3 |
| 25 | 3,320 | 500 | 34 | −29 | 92.8 |
| Polyfluoroprene | 2,670 | 430 | 44 | −46 | 75 |

These vulcanizates show excellent resistance to swelling in water, showing 3% or less volume increase after 2 days at 100° C. The tensile strength of a similar vulcanizate of polyfluoroprene is given in the above table to illustrate the improvement of tensile strength obtained by copolymerization with styrene.

Copolymers of fluoroprene with 10%, 25% and 40% of styrene, prepared as described above, are compounded for electrical insulation purposes according to the following formula:

| | Parts |
|---|---|
| Polymer | 100 |
| Stearic acid | 0.5 |
| Phenyl-alpha-naphthylamine | 2.0 |
| Blanc fixe (barium sulfate) | 100 |
| Catalpo clay | 100 |
| Semi-reinforcing carbon black | 5 |
| Litharge | 20 |
| Sulfur | 3.0 |

The compounded stocks are pressed into thin sheets and cured for 60 minutes at 153° C. The electrical properties of the vulcanizates are illustrated below. The properties of rubber, polychloroprene and a 90:10 chloroprene/styrene copolymer also compounded by formulae designed to give good electrical properties, are included for comparison.

| Per cent styrene | D. C. resistivity,[1] ohms cm. | Dielectric constant[2] | Power factor, per cent[2] | Dielectric strength, v./mil |
|---|---|---|---|---|
| 10 | $2 \times 10^{14}$ | 7.4 | 1.62 | 720 |
| 25 | $1 \times 10^{14}$ | 6.2 | 1.15 | 750 |
| 40 | $2 \times 10^{14}$ | 6.0 | 2.95 | 700 |
| Rubber | $3 \times 10^{14}$ | 5.0 | 1.6 | |
| Polychloroprene | $4 \times 10^{12}$ | 8.6 | 1.6 | |
| Chloroprene: styrene (90:10) | $3 \times 10^{12}$ | 6.2 | 3.12 | |

[1] Electrical tests were determined on specimens 6 x 6 x 0.020 inch.
[2] Dielectric constant and power factor tests were conducted at frequencies of 1000 cycles per second.

It will be noted that in resistivity particularly the fluoroprene/styrene vulcanizates are similar to those of natural rubber and markedly superior to those of polychloroprene. In further comparison with natural rubber, fluoroprene/styrene copolymers are much superior in oil resistance and in ozone or sunlight resistance, showing at the same time good freeze resistance. Copolymerization of chloroprene with 10% of styrene leads to a product having improved resistivity but in contrast to the fluoroprene/styrene rubbers, such chloroprene copolymers show no advantages over polychloroprene in tensile properties or in processing characteristics.

It is to be understood that the examples are illustrative only, and that any ratio of monomers within the limits of 60% to 90% of fluoroprene and 40% to 10% of styrene, may be used. At least 10% of styrene is required to obtain the desired improvement in tensile properties and processing characteristics in comparison with polyfluoroprene itself. In order to maintain a high degree of flexibility and resilience, particularly at low temperatures, not more than 40% of styrene is employed.

It is preferable in using fluoroprene prepared from monovinylacetylene and hydrogen fluoride, that the monomer be essentially free of peroxides and acetylenic compounds, although attractive copolymers from somewhat less pure fluoroprene may be prepared by the proper use of sulfur containing modifiers. Thus, if the fluoroprene contains an appreciable amount of monovinylacetylene, the use of an increased proportion of long chain mercaptan in the polymerization will tend to overcome the deleterious effect of the acetylenic compounds upon the properties of the rubber. While the examples illustrate only the preparation of improved copolymers of 2-fluorobutadiene-1,3, it is to be understood that the invention is applicable likewise to polymerizable fluoroprene homologs such as 2-fluoro-3-methylbutadiene-1,3, 2-fluoro-3-ethylbutadiene-1,3, or 2-fluoro-3-propylbutadiene-1,3.

The monomer mixture may be polymerized in any convenient manner, but generally best results are obtained by using the emulsion polymerization technique. Although the alkaline sodium oleate system as described in the examples is generally preferred, it is possible to use other emulsifying agents in either alkaline or acid media with equally good results. Combinations of emulsifying agents such as the alkali salts of oleic acid and rosin may also be employed to advantage. As polymerization catalyst, potassium persulfate is preferred, although other materials such as hydrogen peroxide, benzoyl peroxide, or sodium perborate may be used if desired. Catalyst activators such as potassium ferricyanide or sodium hydrosulfite, used in conjunction with persulfates or peroxides, are especially beneficial by way of accelerating polymerizations. As polymerization modifier, a long chain mercaptan such as octyl, decyl, or lauryl mercaptan is preferably employed, but other known polymerization modifiers such as sulfur, dialkyl xanthogen disulfides, or carbon tetrachloride may be used. It is possible to carry out these polymerizations under many diverse conditions and in the presence of many different ingredients commonly used for the modification of haloprene or butadiene hydrocarbon polymerization systems.

The polymerization temperature may be varied within the limits of 0° to 80° C., temperatures of from 10° to 40° C. being preferred. The time required to obtain high yields of polymerizate will vary, of course, with the temperature, the catalyst, and the emulsion system employed.

The polymerized latex may be stabilized in any suitable manner, but the addition of a dispersion of an aromatic amine such as phenyl-alpha-naphthylamine, is preferred. It is also possible to add the stabilizer to the coagulum on a rubber mill. The latex may be coagulated by alcohol, acids and brine or other salts such as aluminum sulfate, or by freezing as described in U. S. P. 2,187,146. The use of brine and an acid such as acetic or sulfuric acid is preferred for the coagulation of sodium oleate latices. Processing of the coagulum can be carried out by conventional means.

The polymerization product prepared as described above may be compounded in many different ways in order to obtain vulcanizates having different properties desired for specific uses. In general, the well-known techniques of compounding rubber and butadiene copolymer rubbers with sulfur, a vulcanization accelerator, and a metallic oxide, are applicable to these products. The compounded mass may then be molded, sheeted, calendered, extruded or, in general, formed to the desired shape and vulcanized. The vulcanization may be carried out at room temperature or above, but preferably between 130° C. and 200° C.

The products of this invention are especially valuable for applications in which rubber-like materials are required having good electrical resistance combined with one or more of the following properties, including high sunlight, ozone, and oil resistance or good flexibility at low temperature. Specific applications requiring one or more of these properties are encountered, for example, in the ignition and lighting systems of airplanes, motor vehicles and ships. The rubbers are also suited for use in many of the diverse applications of other synthetic rubbers or natural rubber. For example, they can be employed in the manufacture of tires and molded articles of various types, as impregnants for paper and textiles, for fabric coating by dipping or calendering, etc.

I claim:

1. A synthetic rubber-like material being a copolymer of a fluorobutadiene of the class consisting of 2-fluoro-1,3-butadiene and its methyl, ethyl and propyl homologs, and styrene, in which the styrene comprises from 10% to 40% of the copolymer, and the fluorobutadiene the remainder.

2. A synthetic rubber-like material being a copolymer of 2-fluoro-1,3-butadiene and styrene, in which the styrene comprises from 10% to 40% of the copolymers, and the 2-fluoro-1,3-butadiene the remainder.

3. A synthetic rubber-like material being a copolymer of 2-fluoro-1,3-butadiene and styrene, in which the styrene comprises 10% of the copolymer, and the 2-fluoro-1,3-butadiene the remainder.

LEROY FRANK SALISBURY.

REFERENCES CITED

The following references are of record in the file of this patent:

UNITED STATES PATENTS

| Number | Name | Date |
|---|---|---|
| 1,950,431 | Carothers | Mar. 13, 1934 |
| 2,066,330 | Carothers | Jan. 5, 1937 |
| 2,321,693 | Meisenburg | June 15, 1943 |